March 18, 1930.    N. E. METHLIN    1,750,724
COMBINED AUTOMATIC BREECH CLOSING AND OPENING
AND LOADING MECHANISM FOR AUTOMATIC GUNS
Filed July 1, 1929    14 Sheets-Sheet 1

Inventor
Nicolas Emilien Methlin
By
Cameron, Kerkam & Sutton.
Attorneys.

March 18, 1930.　　　N. E. METHLIN　　　1,750,724
COMBINED AUTOMATIC BREECH CLOSING AND OPENING
AND LOADING MECHANISM FOR AUTOMATIC GUNS
Filed July 1, 1929　　　14 Sheets-Sheet 4

March 18, 1930.    N. E. METHLIN    1,750,724
COMBINED AUTOMATIC BREECH CLOSING AND OPENING
AND LOADING MECHANISM FOR AUTOMATIC GUNS
Filed July 1, 1929    14 Sheets-Sheet 10

Inventor
Nicolas Emilien Methlin.
By
Cameron, Kerkam & Sutton.
Attorneys.

Patented Mar. 18, 1930

1,750,724

UNITED STATES PATENT OFFICE

NICOLAS EMILIEN METHLIN, OF PARIS, FRANCE, ASSIGNOR TO SCHNEIDER & CIE., OF PARIS, FRANCE, A LIMITED JOINT-STOCK COMPANY OF FRANCE

COMBINED AUTOMATIC BREECH CLOSING AND OPENING AND LOADING MECHANISM FOR AUTOMATIC GUNS

Application filed July 1, 1929, Serial No. 375,194, and in France July 23, 1928.

The present invention relates to improvements in small bore automatic guns. This improvement consists in combined means for loading the gun and opening and closing the breech.

The essential improvement consists in a device which permits one of the cartridges to descend from the magazine on to a loading tray when the magazine is placed in position or, more exactly, when the latter is engaged with the cartridge distributing mechanism, this device being moreover combined with a breech mechanism in such a way that when the breech is brought into the open position for loading a first round, the spring which, during normal working, causes the cartridge to be driven into the bore of the gun barrel, also causes the first round to be driven in, the said spring being moreover not under complete tension for driving in this first round but only under a partial tension in a position of rest into which it can be brought by a device operable by hand which at the same time produces the closure of the breech.

One form of construction of the invention is illustrated by way of example in the accompanying drawing.

Fig. 26$^a$ is a detail view taken in the plane of the pin $Q^3$, from the left of Fig. 26.

In these different figures, A is the gun barrel mounted so as to recoil in the known manner in a cradle B, the recoil being restrained by means of a brake of any known type operating by means of a liquid or otherwise; the drawing simply shows a brake cylinder $B^1$ in which moves a piston, the rod C of which is rigid with the gun barrel. The movements of return into battery position of the gun barrel may be obtained in the known manner by a recuperator, not shown, which works with a metal spring, a liquid, pneumatic means or any other known arrangement.

Figure 1:
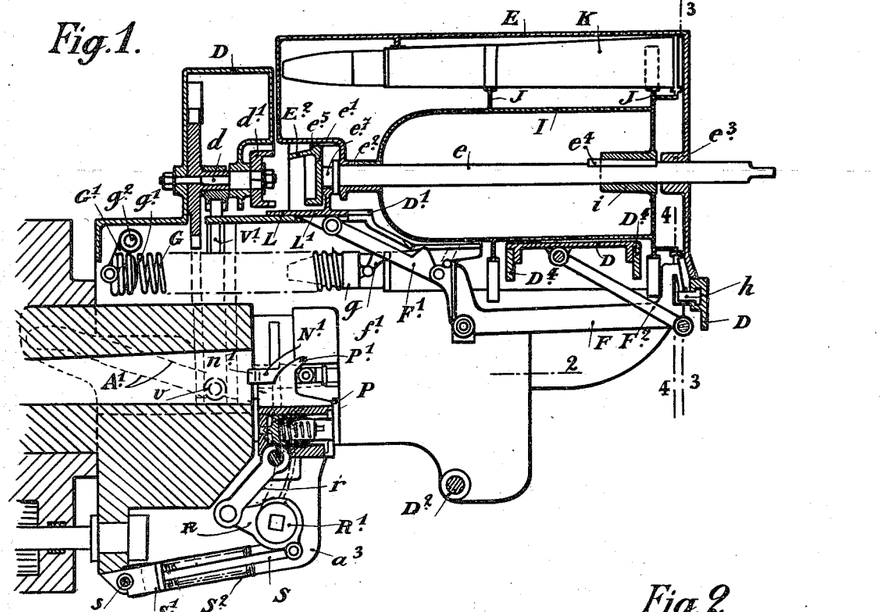
Fig. 1 is a longitudinal sectional elevation taken along the axis of the automatic gun which is provided with the new device and shows a back part of the cradle and the gun barrel in battery position, the breech open and the special charging mechanism placed in position, but before engagement with the releasing device controlling the distribution of the cartridges during firing.
Figure 5:
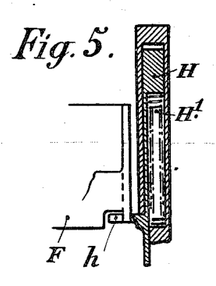
Fig. 5 is a sectional plan of a part to a larger scale showing the device for engaging the loading tray upon the cradle of the gun carriage.
Figure 25:
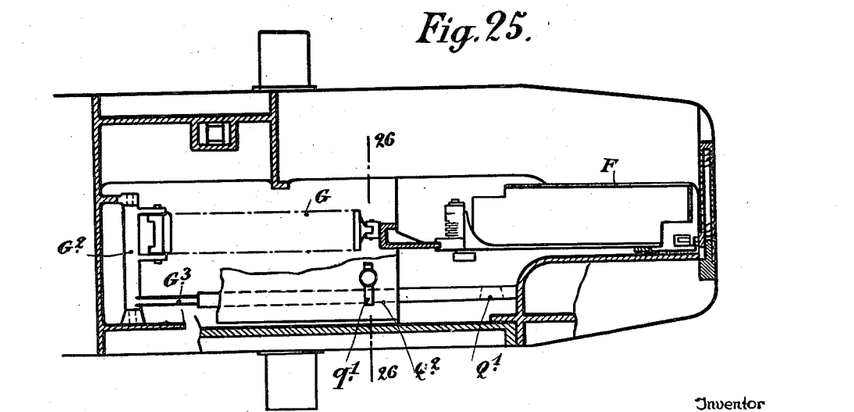
Fig. 25 is a sectional plan view taken along the line 25—25 in Fig. 24.
Figure 26:
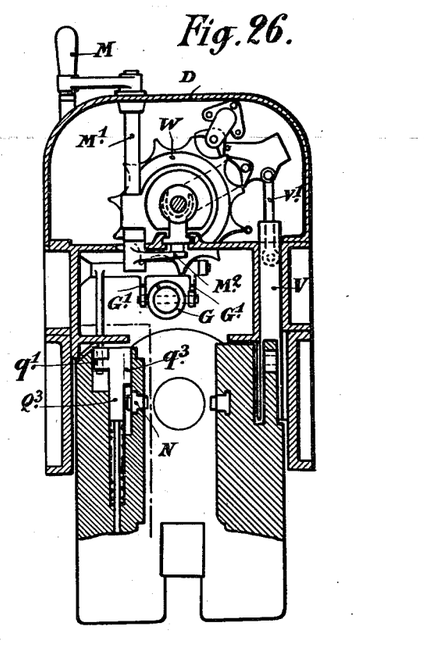
Fig. 26 is a sectional elevation taken along the line 26—26 in Fig. 25.
Figure 26A:
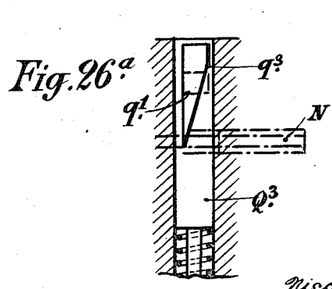

The drawing only shows in detail the parts which form the subject of the invention, that is to say the loading mechanism combined with the breech opening and closing mechanism. The loading device comprises a fixed part D rigid with the cradle and in which is mounted the releasing mechanism controlling the distribution of the cartridges carried in a loader or magazine E. The releasing mechanism may be of any known type. In the example illustrated, the particular mechanism already described in prior U. S. Patent No. 1,674,370 has been shown. The shaft $d$ of this releasing mechanism carries at one end a clutch sleeve $d^1$, with which engages a corresponding coupling member $e^1$ carried by one end of a shaft $e$ turning in two bearings $e^2$ and $e^3$ on the magazine E. From the fixed part D is suspended the loading tray F by two links $F^1$, $F^2$; one of the links $F^1$ carries an arm $f^1$ the free end of which serves as an attachment for one of the ends $g$ of the spring G actuating the tray for driving the cartridge into the bore of the gun barrel. The opposite end $g^1$ of the said spring G is pivoted at $g^2$, to arms $G^1$ projecting from a shaft $G^2$ (Figs. 25 and 26) journalled in the fixed part D. The spring G is normally strongly stressed during the automatic operation of the firearm, the arms $G^1$ being then inclined from back to front as shown in Fig. 1. The tray F is engaged at its back end upon a projection $h$ on a spring pin H, $H^1$ (Fig. 5) movable in the fixed part D, this pin being adapted to be withdrawn (Fig. 14) by the compression of its spring $H^1$ by the rim of the cartridge case when the latter falls upon the loading tray F.

The shaft $e$ which carries the coupling member $e^1$ is adapted to slide in the body I of the drum from which project a series of half collars J or recesses forming supports for the cartridges R. This slidable mounting can be secured for example by means of a key $e^4$ on the shaft $e$ moving in a groove formed in the nave $i$ of the drum I.

Figures 6, 7, 8, 9:
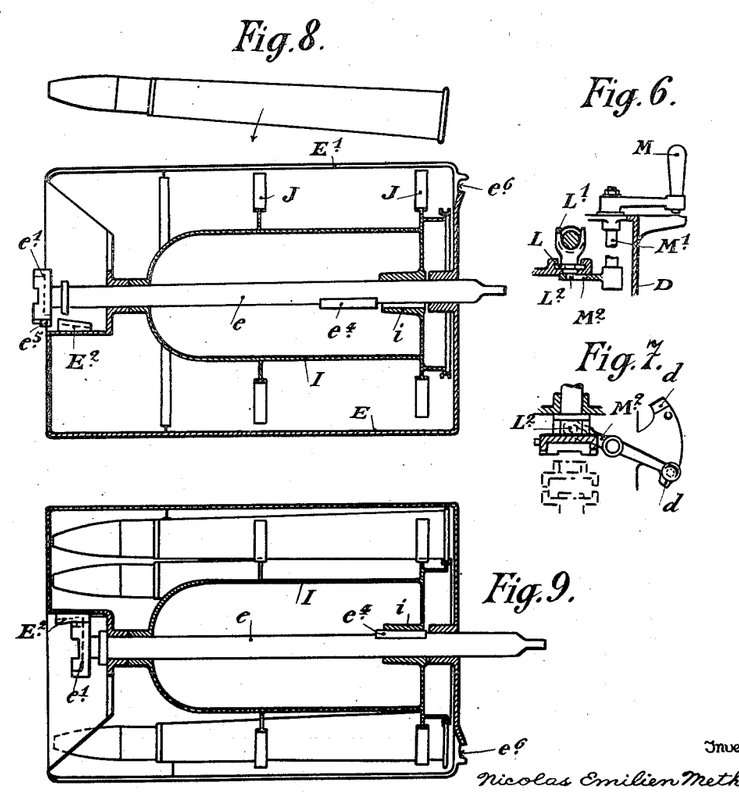
Figs. 6 and 7 are respectively a sectional elevation and a sectional plan view of a part of the device for producing the engagement between the cartridge distributing mechanism and the release which actuates this mechanism as a result of the movement of return into battery position of the barrel.
Figs. 8, 9 and 10 show the magazine or drum empty of cartridges, filled before being placed in position upon the firearm and then while engaging the latter respectively.

When a magazine has been emptied by automatic firing or firing single shots a gun servant removes the magazine by hand after having disengaged the members $d^1$, $e^1$ by means of the mechanism which will be described hereinafter while another gun servant takes the empty magazine (Fig. 8) in order to refill it with cartridges. The gun servant who carries out the firing places a full magazine in position on the firearm. In order to fill a magazine with cartridges it is necessary to be able to turn the drum I and for this purpose to disengage the key $e^4$ from the corresponding groove in the nave $i$ as shown in Fig. 8. The cartridges are inserted through the slot $E^1$ formed in the lower part of the magazine, which slot is situated at the top part of the magazine when this operation is being effected. The cartridges thus rest in the corresponding supports J. When the magazine is full, that is to say when all the supports are filled with cartridges, it is turned back into the position of use and the shaft $e$ is turned into the position it occupies in Fig. 9. In this position a stop $e^5$ on the dog clutch sleeve $e^1$ is engaged in a helical guide $e^2$ projecting from the magazine E.

Figure 3:
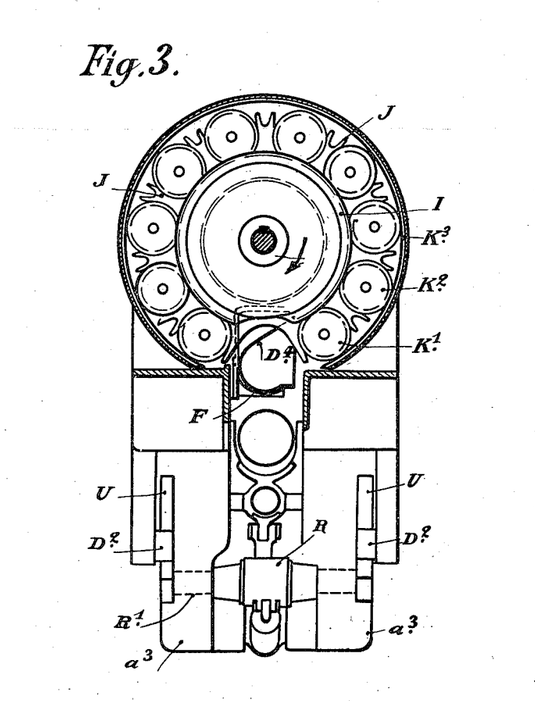
Fig. 3 is a sectional elevation taken along the line 3—3 in Fig. 1.
Figure 10:
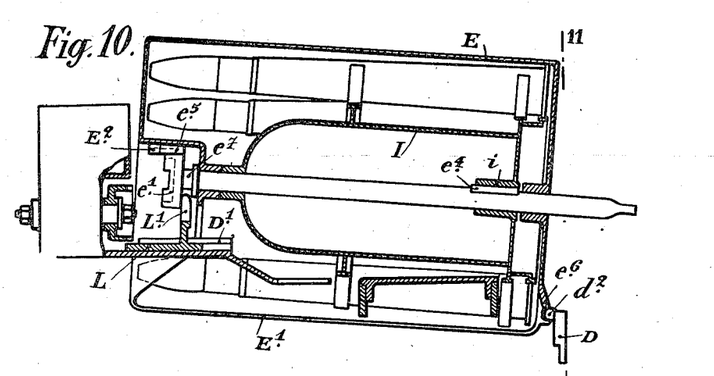
Figure 11:
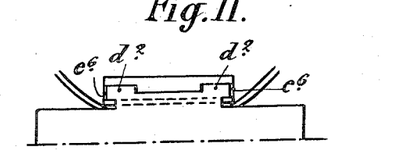
Fig. 11 is a sectional elevation taken along the line 11—11 in Fig. 10.

In order to place the magazine E in position on the firearm, grooves $e^6$ formed in the rear end of the magazine E, are engaged upon corresponding semi-cylindrical tenons or flanges $d^2$ (Figs. 10 and 11). A smooth part $e^7$ of the clutch member $e^1$ then rests in a yoke $L^1$ projecting from a slide block L guided in grooves $D^1$ in the fixed part D. When the magazine has been engaged at the back part upon the flange $d^2$ and at the front part upon the yoke $L^1$ (Fig. 1), the sleeves $e^1$ and $d^1$ are engaged with each other. For this purpose, the gun servant actuates a shaft $M^1$ journalled in the fixed part D (Figs. 6, 7 and 26) by means of a hand lever M. The shaft $M^1$ is provided at its lower end with a lever $M^2$ in which is formed a slideway engaging upon a stud $L^2$ formed below the slide block L. The hand lever M is movable between two stops $d^3$, $d^4$ formed upon a fixed part D. It can be locked in the extreme positions by the projection of a spring buffer lodged in the handle. If the handle is moved from the stop $d^3$ to the stop $d^4$ (Fig. 7), the slide block L is moved and through the latter the shaft $e$. At the same time the latter receives a movement of rotation as a result of the displacement of the stud $e^5$ of the receiver $e^1$ in the helical groove $e^2$. The drum I is then turned through an angle corresponding to the interval between two cartridges so that as the rotation is effected in the direction of the arrow (Fig. 3) the cartridge $K^1$ is brought on to the tray F at the same moment when the dogs of the sleeve $e^1$ engage between those of the sleeve $d^1$. In other words, the first cartridge $K^1$ is transferred from the magazine on to the loading tray at the same time as the engagement is produced between the drum I and the releasing device of the distributing mechanism which will be periodically actuated by the movements of recoil and return into battery position of the gun barrel.

Figure 12:
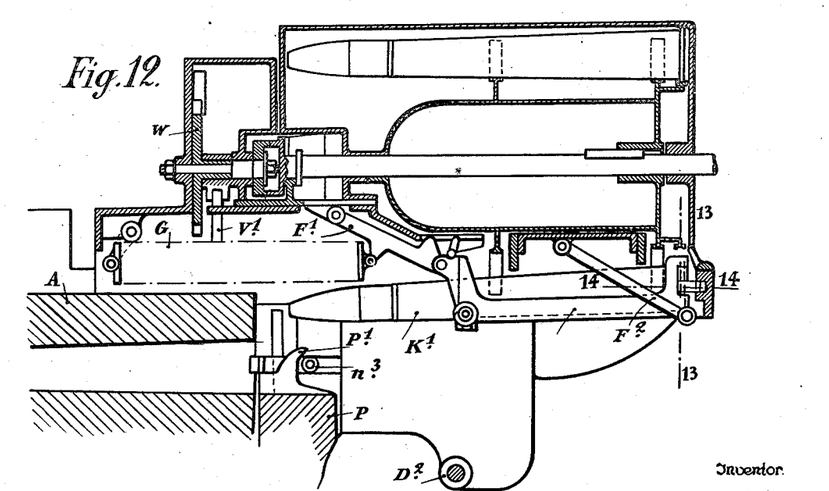
Fig. 12 is a sectional elevation of a part similar to that shown in Fig. 1, showing the magazine engaged upon the releasing device and a first cartridge fitted on to the tray as a result of this engagement, the effect of which is to cause the said tray to be lowered under the action of the weight of the cartridge and the loading spring.
Figure 13:
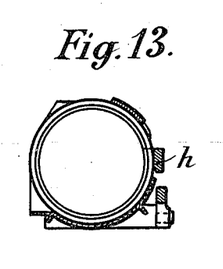
Fig. 13 is a section taken along the line 13—13 in Fig. 12.
Figure 14:
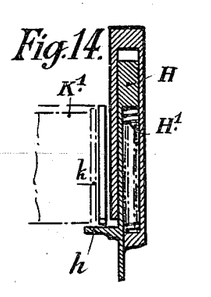
Fig. 14 is a sectional plan view of a part taken along the line 14—14 in Fig. 12.
Figure 15:
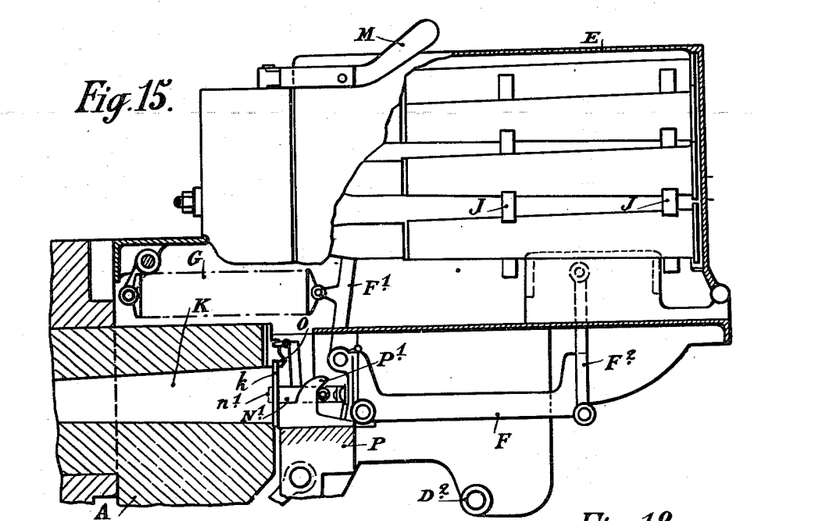
Fig. 15 is a similar sectional elevation to that shown in Figs. 1 and 12, and shows a cartridge driven into the bore of the barrel by the completion of the movement which has been commenced, Fig. 12 showing an intermediate position during this movement.

As a result of the arrival of the cartridge $K^1$ upon the loading tray F, the rim $k$ (Fig. 14) of the cartridge case exerts a pressure upon the projection $h$ of the pin H and drives the latter back so as to make it compress the spring $H^1$. The loading tray F is thus disengaged so that by the action of the spring G, the said tray F swings about the pivots by means of which the links $F^1$ and $F^2$ are pivoted to the fixed part D. The commencement of this movement is shown in Fig. 12 and Fig. 13 shows the disengaged loading tray.

Figure 31:
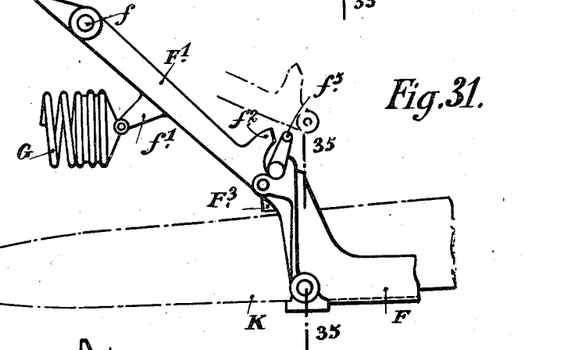
Figure 32:
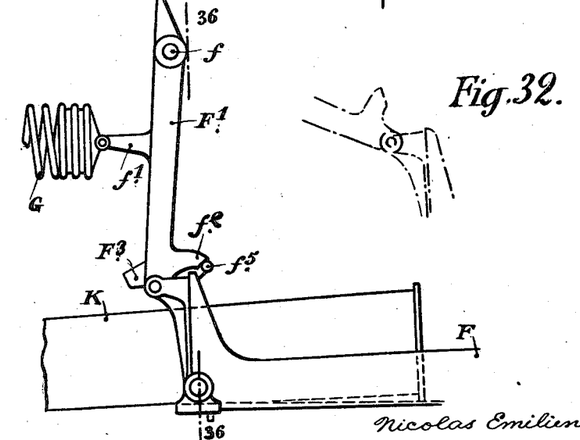
Figure 33:
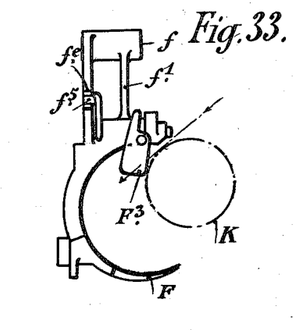
Fig. 33 is a sectional elevation taken along the line 33—33 in Fig. 30.
Figure 34:
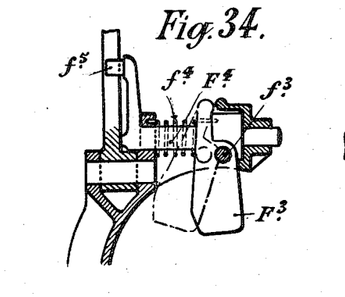
Fig. 34 is a sectional elevation of a detail to a larger scale corresponding to Fig. 33.
Figure 35:
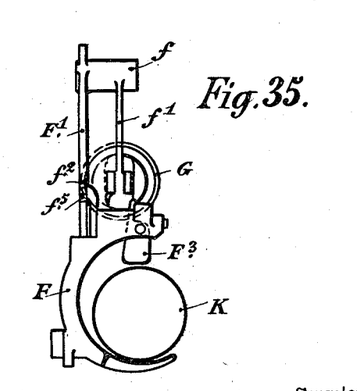
Fig. 35 is a sectional elevation taken along the line 35—35 in Fig. 31.
Figure 36:
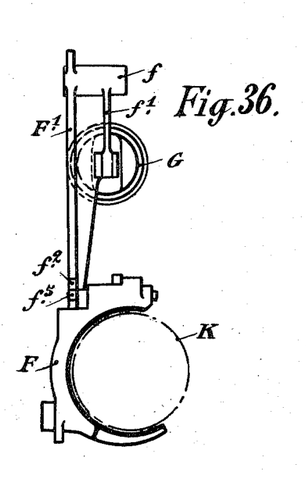
Fig. 36 is a sectional elevation taken along the line 36—36 in Fig. 32.

A device has been provided for preventing the front part of the cartridge from being lifted by inertia when it descends over the tray. This device consists in a stop $F^3$ (Figs. 30 to 36) pivoted at $f^3$ to a shaft $F^4$ journalled in the loading tray. A spring $f^4$ constantly tends to keep this stop in the position indicated in Fig. 34. The withdrawal of the stop $F^3$ in order to permit the loading to be effective, that is to say the cartridge to be driven into the bore of the gun barrel, is effected by a lug $f^2$ carried by the link $F^1$. When a cartridge descends on to the tray, it encounters the stop $F^3$ which swings (Fig. 33) and takes up the position shown in Figs. 31 and 35 when the cartridge is in place. When the tray descends, the link $F^1$ swings about its pivot $f$ and presses by means of its lug $f^2$ upon an arm $f^5$ projecting from the shaft $F^4$. The latter turns and lifts with it the stop $F^3$ which then takes up the position indicated in Figs. 32 and 36.

Figure 21:
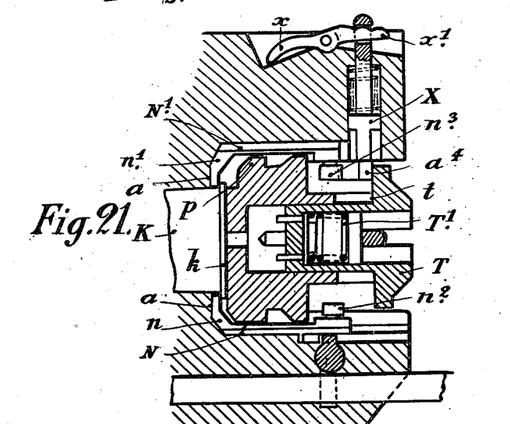
Fig. 21 is a corresponding sectional plan view.
Figure 22:
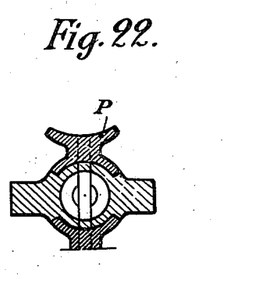
Fig. 22 is an end elevation of a part corresponding to Fig. 21.
Figure 37:
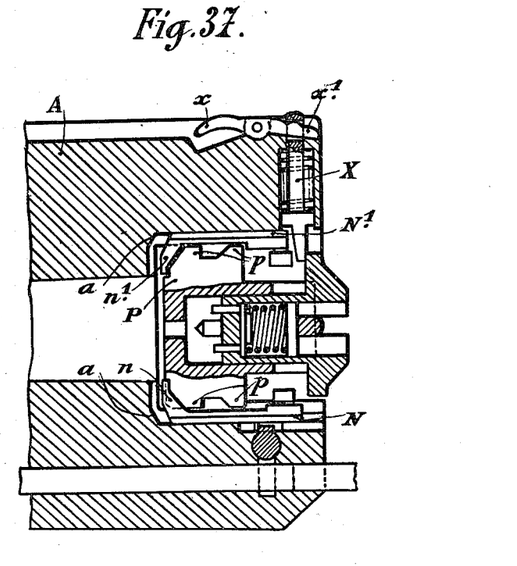
Fig. 37 is a sectional plan view similar to that shown in Fig. 21 showing the members in a different position.
Figure 38:
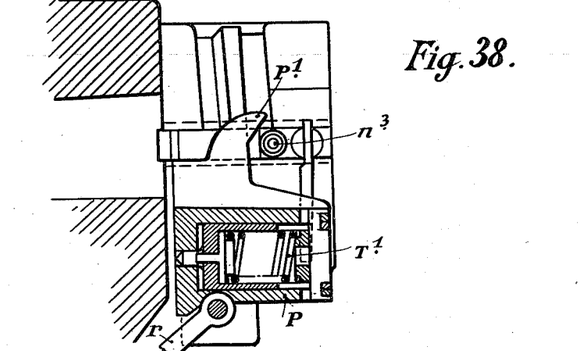
Figs. 38, 39 and 40 are detail views of the device permitting the firearm to fire single shots under control, Fig. 38 being a sectional elevation with the breach open and Figs. 39 and 40 sectional plan views with the breach closed in two different positions of operation.

The rim $k$ of the cartridge case, by penetrating into the bore of the gun barrel, encounters the beaks $n$, $n^1$ of the two extractors N and $N^1$; these extractors are guided in the known manner in grooves in the gun barrel and pass under the pressure of the rim of the cartridge case from the position shown in Fig. 37 to the position shown in Fig. 21 in which their beaks press against the stop $a$. In taking up its position in the bore of the gun barrel, the cartridge also lifts by means of its rim $k$ at latch O (Figs. 15 to 18) guided in a groove $a^1$ in the rear face of the gun barrel. This latch is mounted upon an arm $O^1$ of a shaft $O^2$ carrying a second arm $O^3$ which a spring $O^4$ constantly pushes upwards; this lifting action tends on the other hand to lower the latch O into its engaged position with the rim $k$ and the cartridge thus engaged is held in the loading position.

Figure 16:
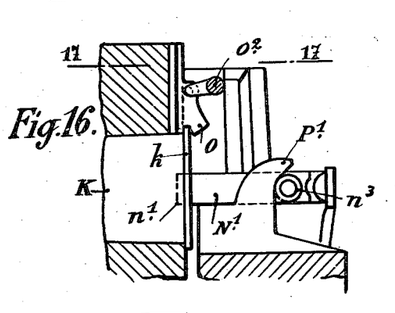
Fig. 16 is a sectional elevation to a larger scale of a detail of the device for securing the cartridge which is engaged in the bore of the gun barrel.
Figure 17:
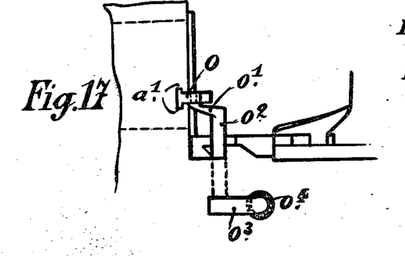
Fig. 17 is a corresponding sectional plan view taken along the line 17—17 in Fig. 16.
Figure 18:
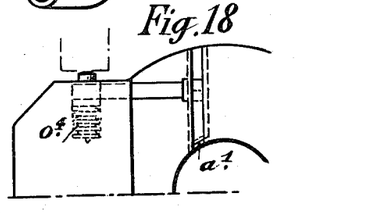
Fig. 18 is a rear elevation of a part corresponding to Fig. 16.
Figure 19:
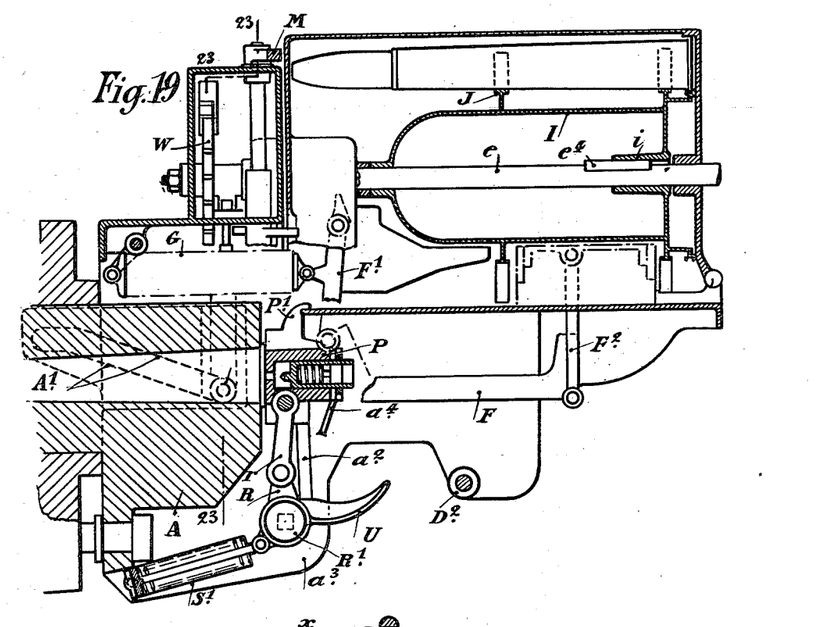
Fig. 19 is a similar sectional elevation to that shown in Figs. 1, 12 and 15 showing the members in the position they occupy before firing, the breech being closed and the striker cocked.
Figure 20:
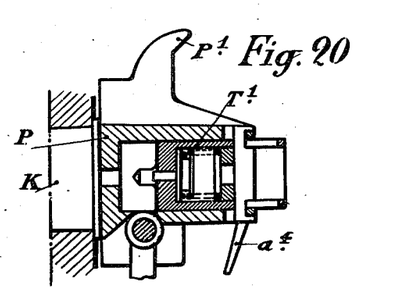
Fig. 20 is a sectional elevation to a larger scale of the firing mechanism.

The passage of the extractor N from the position shown in Fig. 37 to the position shown in Fig. 21 produces the closure of the breech block P. The latter is guided by teeth $p$ in grooves $a^2$ in the gun barrel (Figs. 16 and 19). It is connected by a rod $r$ to a crank arm R keyed upon a shaft $R^1$ journalled in bearings $a^3$ formed in the gun barrel. Upon the crank arm R is pivotally mounted a piston S (Fig. 1) moving in a cylinder $S^1$ pivotally connected at $s$ to the gun barrel. A spring $S^2$ bearing upon the piston S and upon the end of the cylinder $S^1$ constantly tends to raise the breech block P through the medium of the crank arm R and the rod R. The passage of the extractors from the position shown in Fig. 37 to the position shown in Fig. 21, under the pressure of the rim of the cartridge case, permits the spring $S^2$ to act and raise the breech block from the open position (Fig. 1) into the closed position (Fig. 19). While the breech block rises into the closed position, the piston T encounters by its face $t$ (Figs. 20 and 21) an incline $a^4$ formed upon the gun barrel. In this movement the piston stresses by its movement out of the breech block the spring $T^1$. As soon as the piston T escapes from the incline $a^4$ the spring $T^1$ expands and the striker is driven on to the primer of the cartridge.

Figure 2:
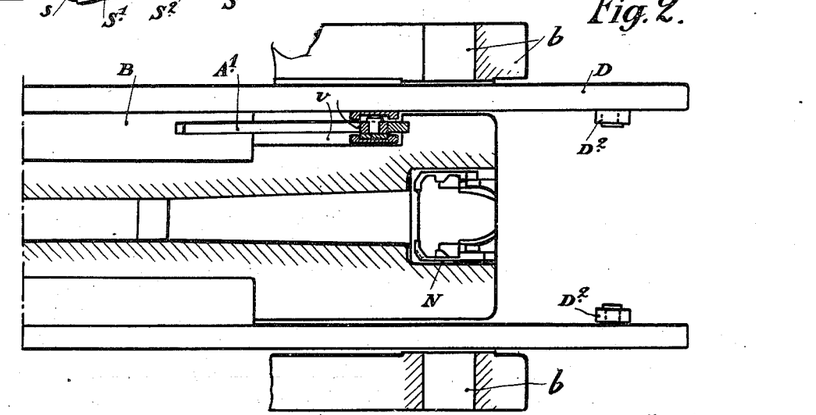
Fig. 2 is a corresponding sectional plan view taken along the line 2—2 in Fig. 1.
Figure 23:
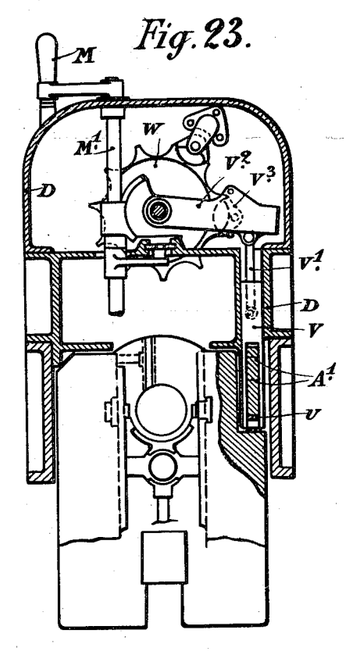
Fig. 23 is a sectional end elevation taken along the line 23—23 in Fig. 19.
Figure 24:
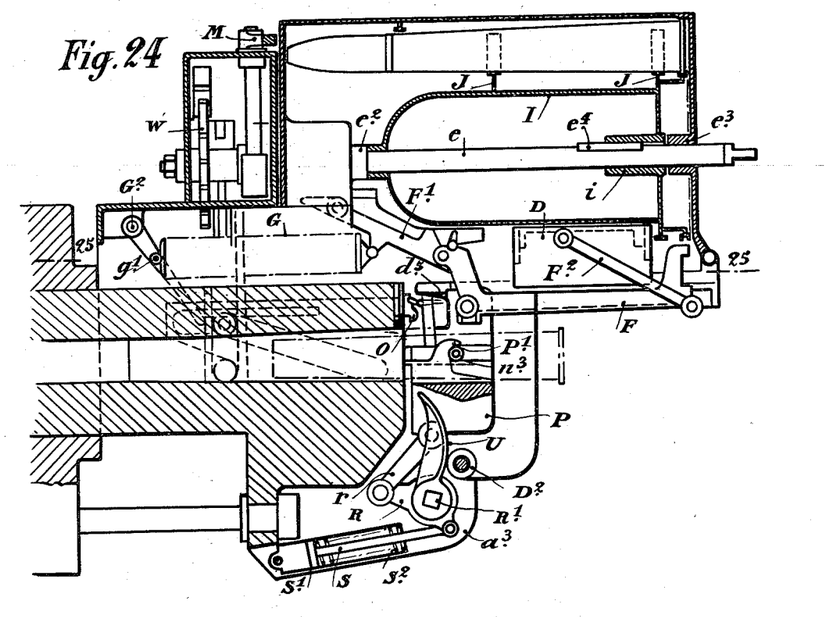
Fig. 24 is a longitudinal sectional elevation analogous to that shown in Fig. 19, and shows the position of the members during the ejection of the spent cartridge case at the end of the recoil.
Figure 42:
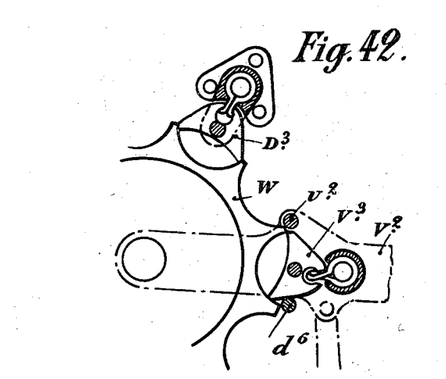
Figs. 42 and 43 are sectional elevations of parts of the release mechanism controlling the distribution of the cartridges.
Figure 43:
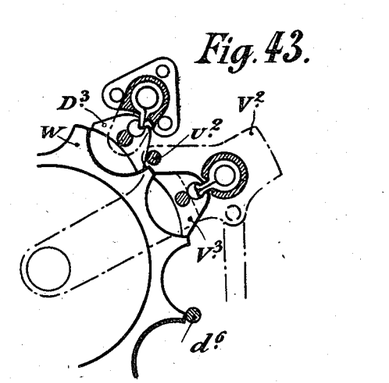

As soon as the shot has been fired the gun barrel A recoils. At the commencement of the recoil two fingers U which form cams and are keyed upon the shaft $R^1$ which carries the crank arm actuating the breech block, encounter the rollers $D^2$ (Figs. 1, 2 and 19) carried by the fixed part D rigid with the cradle. As a result of this encounter (Fig. 24) the shaft $R^1$ oscillates and through the crank arm R and the rod $r$ moves the breech block P in order to bring it into the open position. At the same time the fingers $P^1$ formed upon the breech block P act upon the rollers $n^2$ and $n^3$ carried by the extractors N and $N^1$ respectively. As a result of this action the latter exert a pull on the rim $h$ of the spent cartridge case and cause the latter to be ejected (Fig. 24). The spent cartridge case is moreover allowed to pass out under the action of the extractors on account of the withdrawal of the latch O which is disengaged by the encounter between the lever $O^3$ (Fig. 17) and an incline $d^5$ formed upon the fixed part D. During the recoil moreover a guide $A^1$ formed in the gun barrel moves relatively to a roller $v$ carried by a slide block V guided in the fixed part D rigid with the cradle. To this slide block is pivoted (Fig. 23) a rod $V^1$ connected to a lever $V^2$ pivoted about the shaft of the escapement wheel W between the teeth of which engages the anchor $V^3$ which, during the movement of descent of the slide block V which occurs when the barrel returns into battery position, encounters the stop $d^6$ formed upon the fixed part (Figs. 42 and 43). $D^3$ is an anchor stop which will permit the sprocket wheel or escapement wheel W to be released when the said anchor is struck by a tappet $v^2$ on the lever $V^2$. This escapement mechanism which has been described and illustrated as stated above in U. S. Patent No. 1,674,370 may be replaced by any other similar or equivalent mechanism.

At the end of the movement of recoil the loading tray, the suspension links $F^1$ and $F^2$ of which swing about fixed points on the member D and which is thus gradually raised, encounters the projection $h$ on the pin H and by means of its notch engages upon this projection.

Upon the return into battery position a rotation of the drum I is produced which is controlled by the escapement mechanism, the operation of which is obtained by the guide $A^1$ which carries along the roller $v$. A fresh cartridge $K^2$ which has taken up the place of the cartridge $K^1$ thus descends on to the loading tray F in which movement it is guided by the inclined planes $D^4$ (Figs. 1 and 3) carries by the fixed path.

After this the operation described above is repeated; the loading tray F swings, the spring G assisted by the weight of the cartridge causes the cartridge to be driven into the bore of the gun barrel, the breech is closed, the cartridge is fired and so on.

Figure 39:
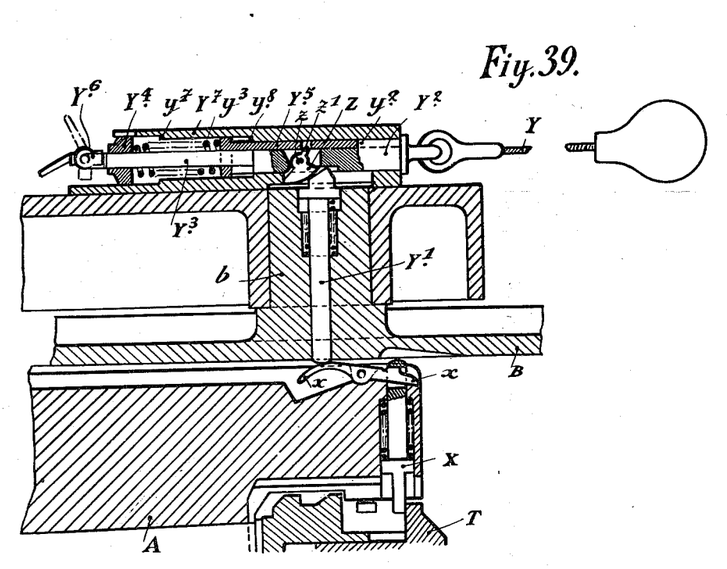

For firing single shots provision has been made of a pin X movable in a lodgment in the gun barrel and normally forming a retaining means for the striker T as shown in Fig. 39. As will be seen, this pin remains permanently withdrawn out of engagement with the striker in the case of automatic firing. The withdrawal of the pin X for releasing the striker is effected when firing single shots by means of a cable Y acting upon a spring controlled push rod $Y^1$ guided in one of the journals $b$ of the cradle B. The push rod in its turn acts upon one of the arms $x$ of a rocking lever $x$—$x^1$ pivotally mounted in the gun barrel A; the arm $x^1$ being engaged in a slot in the pin X. The action exerted upon the cable is transmitted to the push rod $Y^1$ by a spring sliding member $Y^2$—$Y^3$—$y^2$.

The spring $y^3$ bears at one end upon a collar $Y^4$ movable upon the rod $Y^3$ of the sliding block. It presses at its other end upon a sleeve $Y^5$ fitting over the slide block $Y^2$ and upon its rod $Y^3$. This sleeve $Y^5$ is movable with respect to the body $Y^2$ of the slide block and is adapted to abut against the end $y^2$ of a notch in the slide block body.

In a cavity in the slide block body $Y^2$ is pivotally mounted upon a pin $z$ a cam Z provided for the purpose of pushing out the pin $Y^1$ in order to make it act upon the arm $x$ of the rocking lever $x$—$x^1$. The cam Z is provided with a beak $z^1$ engaging in a slot $y^5$ in the sleeve $Y^5$. At the flat end of the rod $Y^3$ is pivoted a yoke $Y^6$ which can be placed either in the position shown in full lines in Fig. 39 and in the position shown in dot and dash lines in the same figure. According to the position occupied by the yoke $Y^6$ the collar $Y^4$ as a result of the pull exerted upon the cable Y will be able to effect a stroke of varying length before abutting against a shoulder $y^7$ on the guide $Y^7$ in which move the slide block $Y^2$—$Y^3$ and the sleeve $Y^5$. The movement of the sleeve $Y^5$ is itself limited by a shoulder $y^8$ formed in the guide $y^7$ rigid with the cradle B.

If a continuous pull is exerted upon the cable Y when the members are in the position shown in Fig. 39, the collar $Y^4$ will abut against the shoulder $y^7$ and the end of the sleeve $Y^5$ against the shoulder $y^8$. The cam Z will press on the head of the push rod $Y^1$ and the latter will cause the rocking lever $x$—$x^1$ to swing so as to disengage the pin X. The striker will thus be liberated and automatic firing may be carried out. The pin X will remain disengaged in its withdrawn position as long as a pull is exerted upon the cable Y.

Figure 40:
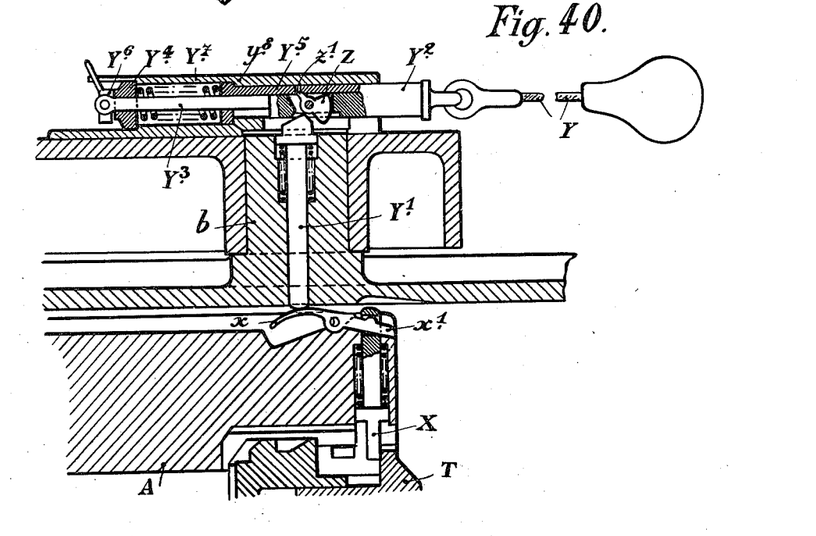
Figure 41:
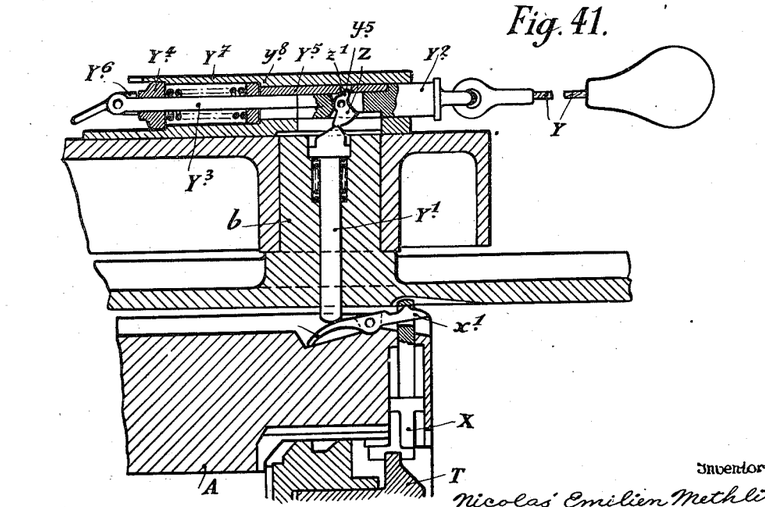
Fig. 41 is a similar plan view to that shown in Figs. 39 and 40 showing the position of the parts of the actuating device during the automatic operation of the firearm.

If it is desired to fire single shots a cable Y is released and the yoke $Y^6$ is raised so as to bring it into the position shown in dot and dash lines in Fig. 39. By exerting a fresh pull upon the cable the slide block $Y^2$ will be allowed to effect a longer travel in view of the fact that the collar $Y^4$ has been able to move towards the upturned yoke. The members will then take up the position shown in Fig. 40 under the action of the spring $y^3$.

During the movement of the slide block $Y^2$ the cam Z has pushed down the push rod $Y^1$ and by means of the rocking lever $x$—$x^1$ has disengaged the pin X. A round has thus been fired followed by the recoil and return into battery position of the gun barrel. If the cable Y is released the spring $y^3$ expands and returns the slide block $Y^2$ into the position shown in Fig. 39, the yoke $Y^6$ remaining however upturned in the position shown in dot and dash lines in this figure. Another round can however be fired when the pin X has again locked the striker T by exerting a fresh pull on the cable Y after the return into battery position of the gun barrel and then releasing the cable. The firearm comprises a device which permits the loading spring G to be relieved during transport. This device is shown more particularly in Figs. 24 to 28 inclusive, and in Fig. 37. The shaft $G^2$ which serves as a pivot for the pivot arm of the spring G carries a lever $G^3$ engaged in a fork $q$ formed at the end of a rod Q sliding in the gun barrel. In this rod are formed two notches or catches $Q^1$, $Q^2$. A spring pin $Q^3$ operated by hand by means of a pulling handle $q^2$ is adapted to be made to engage in these notches by means of a projection $q^1$. Upon the opposite side to the projection $q^1$ the pin $Q^3$ comprises an inclined plane $q^3$ as shown more clearly in Fig. $26^a$ which, when a pull is exerted upon the spring pin through the pulling handle $q^2$, encounters the extractor arm N in order to push it back towards the bore of the gun barrel with a view to producing the closure of the breech. In other words, if it is desired to arrange the parts of the loading mechanism for transport and close the breech at the same time, it is sufficient to exert a pull upon the pulling handle $q^2$. The pin $q^3$ is lowered, the projection $q^1$ disengaged from catch $Q^1$ through permitting the spring G to expand partly until, when the pulling handle $q^2$ is released, the projection $q^1$ becomes engaged in the catch $Q^2$ (Fig. 25) at the same time as the rod Q abuts by its free end against the fixed part. During this movement the breech has been closed as stated above by the forward displacement of the extractor arm N which permits the spring $S^2$ to act upon the transmission mechanism R—$r$ in order to raise the breech block into the closed position.

The spring G, while being suitably expanded nevertheless retains a sufficient tension to permit a first cartridge to be driven into the bore of the gun barrel. When the gun barrel recoils after firing the first round from each magazine, the projection $q^1$ on the pin $Q^3$ will be disengaged by the action exerted by the inclined plane upon the back face of the catch $Q^2$. The said projection will slide under the rod Q until it again engages in the catch $Q^1$.

Figure 4:
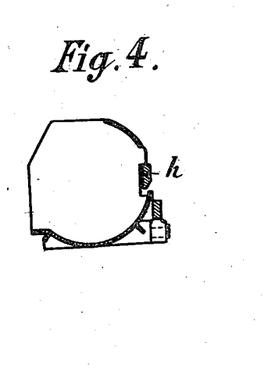
Fig. 4 is a cross section to a larger scale taken along the line 4—4 in Fig. 1.
Figure 4A:
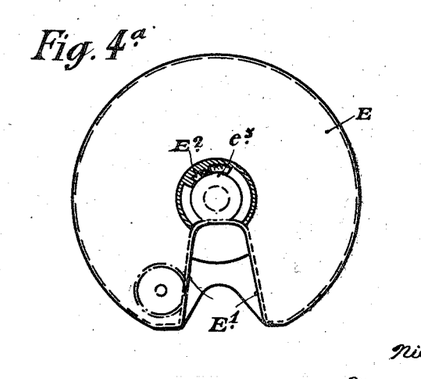
Fig. 4a is an end elevation of the magazine.
Figure 27:
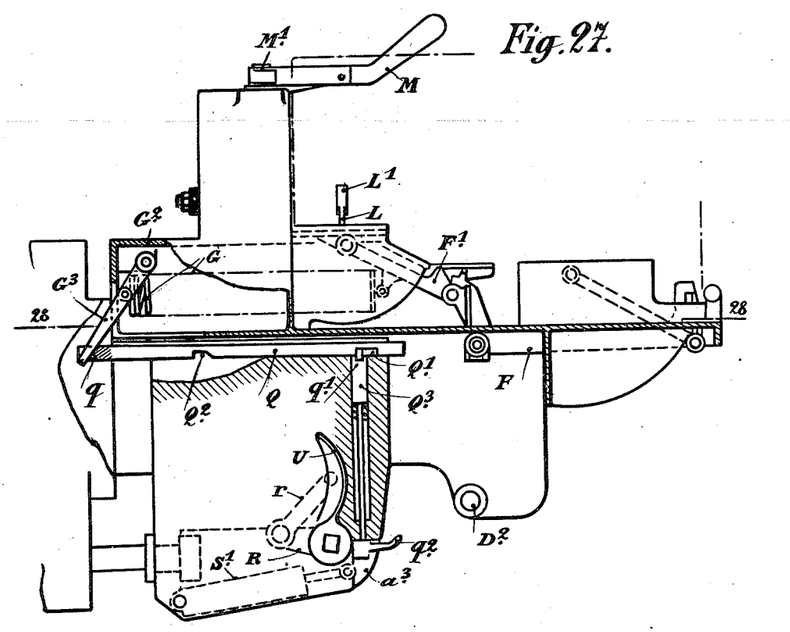
Fig. 27 is a longitudinal elevation with a part in section showing the manner in which the spring, which drives the projectile into the bore of the gun barrel, becomes stressed at the end of the return to battery position of the gun barrel.
Figure 28:
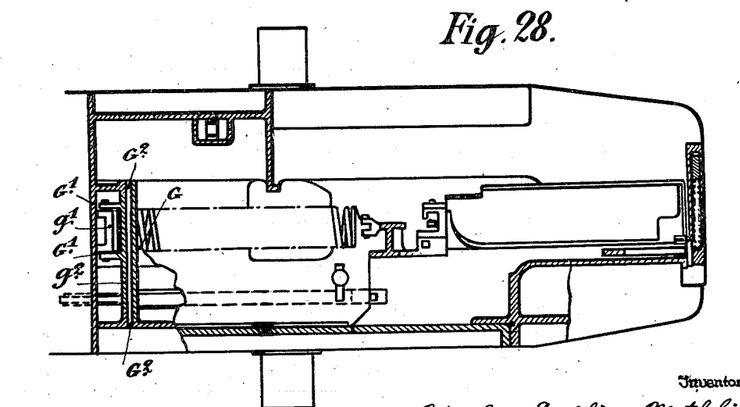
Fig. 28 is a corresponding section plan view taken along the line 28—28 in Fig. 27.
Figure 29:
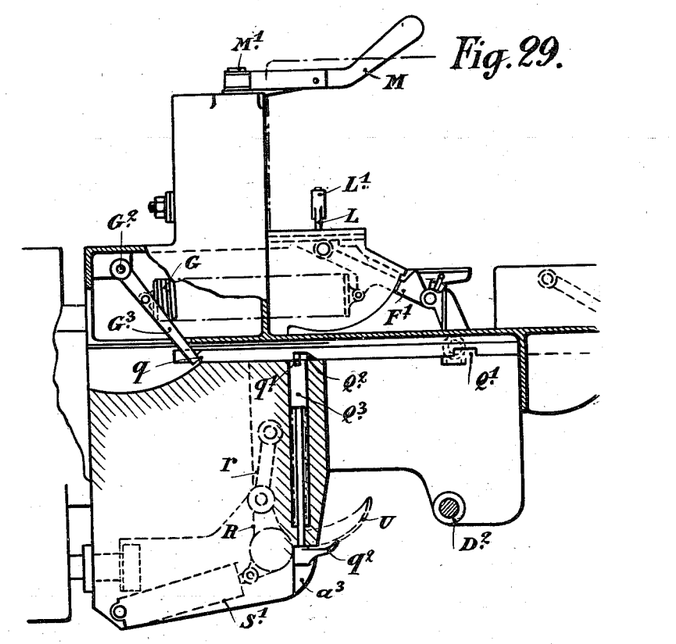
Fig. 29 is a similar view to that shown in Fig. 27 showing the projectile loading spring in the position into which it is placed for transport and which it will occupy for loading the first projectile from a full magazine.
Figure 30:
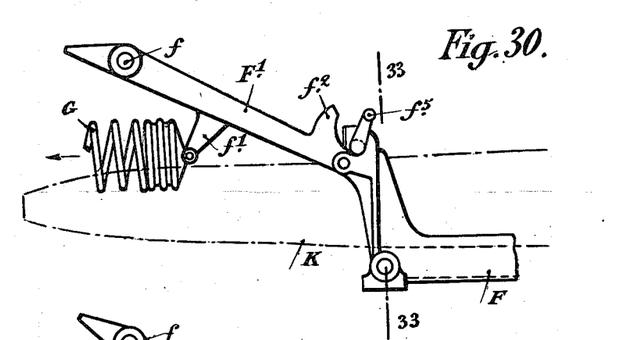
Figs. 30, 31 and 32 are detail views in elevation of the projectile loading tray in three different positions while the projectile is being received and driven into the bore of the gun barrel.

Upon the return into battery position the projection $q^1$ engaged in the catch $Q^1$ carries along the rod Q and through the latter, the lever $G^3$ which will again pass from the position shown in Fig. 4 to that shown in Figs. 1 and 27. The spring will thus again be completely stressed.

Claims:

1. Combined automatic breech closing and opening and loading mechanisms for automatic guns comprising a drum loader characterized by the feature that the shaft of this drum which is movable longitudinally in the magazine casing, is provided at its front end with a clutch member guided in a helical guide in the said casing of the magazine so that a pull exerted upon the shaft of the drum imparts an angular movement to the said drum which causes a first cartridge to descend on to a loading and driving in tray suspended by rods from a fixed part while the clutch member carried by the shaft of the drum becomes coupled with a complementary clutch member carried by a release mechanism of any known type controlled by the movements of recoil and return into battery position of the gun barrel, the projectile being driven by a stressed spring pivoted at one end to the suspension links of the loading tray and at the other end to a shaft journalled in the fixed part.

2. Combined automatic breech closing and opening and loading mechanism wherein to a loading spring of the loading tray is connected by means of a lever to a member such as a rod guided in the barrel and provided with two notches or catches for engagement with a locking pin adapted to be operated by hand, which pin, for the position of rest of the firearm, permits the said loading spring to become partly relaxed while remaining sufficiently stressed to load the first cartridge, the engagement of the pin for the position of partial expansion of the spring producing the automatic closure of the breech by the action of the said pin upon one of the extractors by bringing the latter into the position in which it permits the breech closing spring to act, the breech being opened during firing by the action of cams acting upon the transmission mechanism connected to the breech block by the abutment of these cams or rollers carried by the fixed part.

In testimony whereof I have signed this specification.

NICOLAS EMILIEN METHLIN.